(12) United States Patent
Ho et al.

(10) Patent No.: US 11,533,183 B2
(45) Date of Patent: Dec. 20, 2022

(54) SECURE PROVISIONING OF DIGITAL CERTIFICATE

(71) Applicant: Lennox Industries Inc., Richardson, TX (US)

(72) Inventors: Nguyen Trong Ho, Highland Village, TX (US); Sunil Khiani, Plano, TX (US)

(73) Assignee: Lennox Industries Inc., Richardson, TX (US)

( * ) Notice: Subject to any disclaimer, the term of this patent is extended or adjusted under 35 U.S.C. 154(b) by 413 days.

(21) Appl. No.: 16/739,982

(22) Filed: Jan. 10, 2020

(65) Prior Publication Data
US 2021/0218579 A1 Jul. 15, 2021

(51) Int. Cl.
| *H04L 29/06* | (2006.01) |
| *H04L 9/32* | (2006.01) |
| *H04L 9/06* | (2006.01) |
| *H04L 9/00* | (2022.01) |

(52) U.S. Cl.
CPC .......... *H04L 9/3265* (2013.01); *H04L 9/0643* (2013.01); *H04L 9/3268* (2013.01); *H04L 9/50* (2022.05)

(58) Field of Classification Search
None
See application file for complete search history.

(56) References Cited

U.S. PATENT DOCUMENTS

| 6,314,521 | B1 * | 11/2001 | Debry | H04L 9/3263 726/10 |
| 6,918,042 | B1 * | 7/2005 | Debry | H04L 9/3263 380/243 |
| 11,298,127 | B2 * | 4/2022 | Shelton, IV | A61B 17/115 |
| 2005/0138388 | A1 * | 6/2005 | Paganetti | H04L 63/0823 713/185 |
| 2009/0086967 | A1 * | 4/2009 | Ozawa | H04L 9/0897 380/44 |
| 2011/0208958 | A1 * | 8/2011 | Stuedi | G06F 16/176 709/224 |
| 2017/0214700 | A1 * | 7/2017 | Bacastow | H04L 63/1433 |
| 2020/0242249 | A1 * | 7/2020 | Kumar | H04L 41/082 |
| 2021/0056230 | A1 * | 2/2021 | Khassanov | H04L 9/0825 |
| 2021/0218579 | A1 * | 7/2021 | Ho | H04L 9/3265 |
| 2021/0218718 | A1 * | 7/2021 | Ho | H04L 9/0894 |
| 2021/0266334 | A1 * | 8/2021 | Bacastow | G06F 21/552 |

OTHER PUBLICATIONS

U.S. Appl. No. 16/739,945, filed Jan. 10, 2020, Ho.

* cited by examiner

*Primary Examiner* — Jeffery L Williams
(74) *Attorney, Agent, or Firm* — Baker Botts L.L.P.

(57) ABSTRACT

A system, includes a device and a payload warehouse. The device receives a user request to initiate a feature of the device. In response to receiving the request, device information is provided to a payload warehouse. The payload warehouse stores an inventory which includes a digital payload. The digital payload includes data, such as a digital certificate, which may be used by the device to implement the user-requested feature. The payload warehouse receives the device information provided by the device and determines an encryption vector based at least in part on the received device information. Using the encryption vector, the digital payload is encrypted. The encrypted digital payload is provided to the device.

19 Claims, 6 Drawing Sheets

SECURE PROVISIONING OF DIGITAL CERTIFICATE

TECHNICAL FIELD

The present disclosure relates generally to delivery of a digital payload. In certain embodiments, the present disclosure relates to secure provisioning of a digital certificate.

BACKGROUND

Heating, ventilation, and air conditioning (HVAC) systems are used to regulate environmental conditions within an enclosed space. A smart thermostat, which is connected to a network, may be configured to control certain operations of an HVAC system. In some cases, a smart thermostat may receive instructions via the network from a utility provider in order to adjust operation of the HVAC system to reduce energy consumption during times of high energy demand (e.g., during extreme weather events or when utility infrastructure is unavailable). In order for these instructions to be received, the smart thermostat may need to have an appropriate digital certificate to allow communication with the utility provider.

SUMMARY OF THE DISCLOSURE

In an embodiment, a system includes a secure payload generator and a payload warehouse. The secure payload generator receives a payload, which includes a private key and a corresponding public key. For example, the private key may include information for decrypting a message encrypted with the public key. An encryption vector is determined based at least in part on the public key. The private key is encrypted using the determined encryption vector. The encrypted private key and the corresponding public key are provided to the payload warehouse. The payload warehouse stores the encrypted private key and the corresponding public key as a secured payload.

In yet another embodiment, a system, includes a device and a payload warehouse. The device receives a user request to initiate a feature of the device. In response to receiving the request, device information is provided to a payload warehouse. The payload warehouse stores an inventory which includes a digital payload. The digital payload includes data, such as a digital certificate, which may be used by the device to implement the user-requested feature. The payload warehouse receives the device information provided by the device and determines an encryption vector based at least in part on the received device information. Using the encryption vector, the digital payload is encrypted. The encrypted digital payload is provided to the device.

This disclosure encompasses the recognition of previously unrecognized problems associated with storing and transmitting digital payloads. As an example, this disclosure encompasses the recognition of problems associated with storing and provisioning digital certificates (i.e., which may be included in a digital payload) to smart thermostat devices. As described briefly above, a utility provider may provide instructions to a thermostat device for operating an HVAC system in a manner that consumes less energy during demand response times when energy demand is projected to outpace energy supply. In order for the devices to appropriately receive and implement such instructions, the devices generally need an appropriate digital payload (e.g., a digital certificate). However, there is a lack of tools for reliably and securely provisioning these digital payloads to multiple devices. Communications between a smart thermostat device may also involve two-way authentication and verification where both the utility provider and the thermostat device have both a private key and a public key, which are used, in this illustrative scenario, to authenticate the transaction of demand response instructions by both the utility provider and the thermostat device. Previous technology provides inadequate security for the storage and reliable provisioning of payloads that include both a public key and a private, which requires increased security.

The unconventional approaches to payload storage and delivery contemplated in this disclosure solve problems of previous technology, including the previously unrecognized problems described above, by facilitating both 1) secure encryption and storage of payloads in a secured payload warehouse and 2) secure provisioning of the encrypted payloads in a device-specific manner, such that, in certain embodiments, only the requesting device can successfully access a requested payload (i.e., such that an intercepted payload cannot be decrypted by a bad actor who is not in possession of information available only to the requesting device). This disclosure particularly solves newly recognized problems associated with securely provisioning public and private keys to a plurality of remotely deployed devices, such as the smart thermostats described above. Accordingly, some embodiments of the systems, methods, and devices described in this disclosure remove bottlenecks to implementing two-way authentication and verification, such as is used by utility providers to provide demand response instructions to smart thermostat devices for improved energy efficiency. As such, the systems, methods, and devices described in this disclosure may be integrated into a practical application for improving the performance of smart thermostat devices and associated HVAC systems by facilitating more effective encryption of digital certificates (e.g., as described with respect to FIGS. 2-3 below) and/or for more secure and reliable provisioning of these digital certificates to field-deployed smart thermostat devices on an as-needed basis (e.g., as described with respect to FIG. 4 below).

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 5 of the drawings, like numerals being used for like and corresponding parts of the various drawings.

As described above, prior to this disclosure, there was a lack of tools for reliably and securely storing digital payloads and provisioning these payloads to multiple devices. For example, there are several challenges associated with providing appropriate digital certificates to multiple smart thermostat devices in order for the thermostats to successfully receive instructions from a utility provider. For instance, if digital certificates are provisioned when thermostats are manufactured (e.g., or before they are deployed in the field), there is a chance that many of the digital certificates will not be used, because not all thermostats will be installed in locations that participate in demand response events. This results in a waste of the digital certificate resources. Furthermore, if digital certificates are provisioned when the thermostats are manufactured, there is an increased likelihood that these digital certificates may be compromised (e.g., intercepted by a bad actor), because the digital certificates are stored in a permanent memory (e.g., read-only memory, or ROM) of the thermostat. This disclosure encompasses the recognition that, in various cases, it may be preferable to 1) securely store specially encrypted digital payloads in a payload warehouse (e.g., as described with respect to FIGS. 1-3) and/or 2) provision these payloads when requested (e.g., as described with respect to FIG. 4 below).

Payload Storage and Provisioning System

Figure 1:
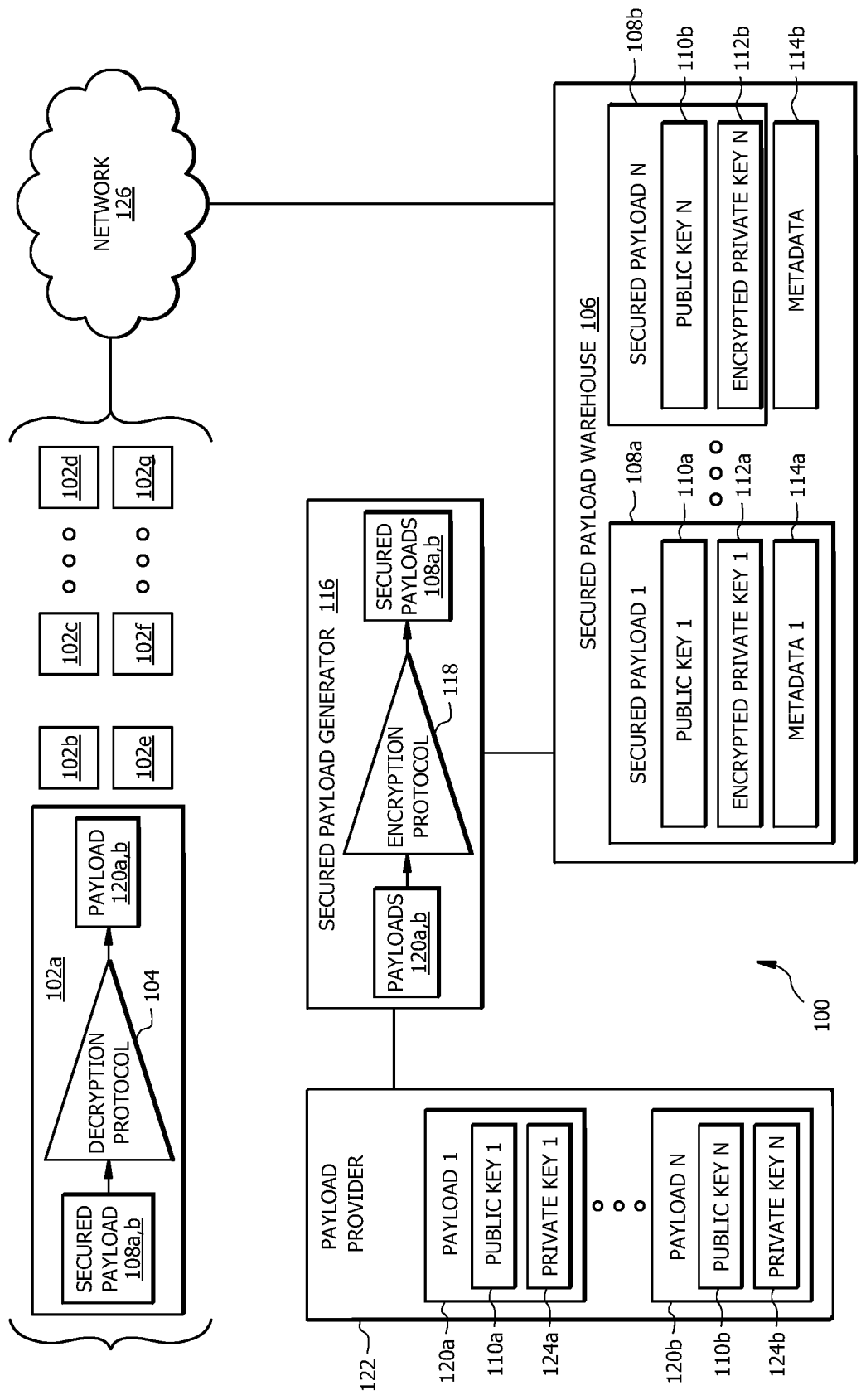
FIG. 1 is a diagram of an example system configured for payload storage and provisioning.

FIG. 1 is a schematic diagram of an embodiment of system 100 configured to securely and reliably store digital payloads 120a,b as secured payloads 108a,b and provision these secured payloads 108a,b to devices 102a-g on an as-needed basis. System 100 includes devices 102a-g, a secured payload warehouse 106, a secured payload generator 116, a payload provider 122, and a network 126. The system 100 is generally configured such that payloads 120a,b from the provider 122 can be securely and reliably transferred to devices 102a-g with a reduced likelihood that the original payloads 120a,b will be compromised (e.g., intercepted and/or used by a bad actor). As described in greater detail below, the payload generator 116 may specially encrypt each private key 124a,b of the original payloads 120a,b using the corresponding public key 110a,b to facilitate secure storage of this information as secured payloads 108a,b. The devices 102a-g are configured to determine the original payload 120a,b from secured payloads 108a,b received from the payload warehouse 106.

The devices 102a-g are generally any devices configured to communicate using network 126 and receive secured payloads 108a,b from the payload warehouse 106. Each device 102a-g may be deployed in a different location. For instance, in some embodiments, each device 102a-g is an internet-of-things device (e.g., a network-connected device configured to transmit data via the network 126 to implement function(s) of the device 102a-g). For example, each device 102a-g may be a smart thermostat device deployed in a unique location (e.g., a residential or commercial location) and configured to control certain functions of an HVAC system. Such smart thermostat devices 102a-g may be configured to operate according to demand response instructions received from a utility provider in order to reduce energy consumption by the HVAC system controlled by the smart thermostat device 102a-g, and the payloads 120a,b may be used to facilitate the two-way authentication and verification associated with transmission of these demand response instructions. Devices 102a-g may be implemented using the processor, memory, and interface of device 500 described below with respect to FIG. 5.

Each of the devices 102a-g may include one or more decryption protocols 104. A decryption protocol 104 may be configured to determine the original payloads 120a,b from the secured payloads 108a,b. As described further below, in some embodiments, the devices 102a-g may use a public key 110a,b to decrypt a corresponding encrypted private key 112a,b of a received secured payload 108a,b. To provide for further increased security, a decrypted private key (i.e., an original private key 124a,b) may be stored in a temporary memory (e.g., in random-access memory, or RAM) of the device 102a-g, such that the private key 124a,b cannot be compromised when the device 102a-g is no longer in use (e.g., when the device 102a-g is turned off). Examples of such embodiments are described in greater detail below with respect to FIGS. 2 and 3B. In some embodiments, each device 102a-g receives the secured payloads 108a,b in an encrypted form (e.g., in an encrypted envelop) and is configured to decrypt the encrypted secured payloads 106a,b. For instance, a secured payload 108a,b may be encrypted based on information unique to the device 102a-g that receives the payload 108a,b (e.g., a unique device serial number, processor identifier, and/or any other device-specific information), and the device 102a-g may use this information to decrypt the encrypted secured payload 108a,b. Examples of such embodiments are described in greater detail below with respect to FIG. 4.

The payload warehouse 106 is generally any computing device or collection of computing devices (e.g., implemented as a server) and is configured to store secured payloads 108a,b generated by the payload generator 116 (described below). In this example, each secured payload 108a,b includes a public key 110a,b, a private key 112a,b, and metadata 114a,b. The public key 110a,b may include information for encrypting any information such as a file or message. For instance, before a device 102a-g transmits a message to a third party (e.g., to a utility provider to confirm receipt of demand response instructions), the message may be encrypted using the public key 110a,b. An encrypted private key 112a,b is an encrypted version of a private key 124a,b from the payload provider 122 (described below). Each private key 124a,b may include information for decrypting a message that was encrypted using a corresponding public key 110a,b. The metadata 114a,b generally includes information about how the private keys 124a,b were encrypted by the payload generator 116, as described in greater detail with respect to FIGS. 2A and 2B below. For instance, the metadata 114a,b may include an amount that an encryption vector was rotated during encryption performed by the payload generator 116, and/or a corresponding amount a decryption vector should be rotated during decryption of the secured private key 112a,b by device 102a-g. In some embodiments, as shown for secured payload 108b and metadata 114b, the metadata 114b may not be included in the secured payload 108b. In such an embodiment, the metadata 114b may be provided to the device 102a-g via a side channel. This may make the system 100 further resilient and secure. In some cases, the metadata 114b, rather than being specific to a given secured payload 108a or 108b may include information for securely a plurality of secured payloads 108a,b (e.g., information for appropriately implementing the decryption protocol 104 for a number of payloads 108a,b). The payload warehouse 106 may be implemented using the processor, memory, and interface of the device 500 described with respect to FIG. 5 below.

The secured payload generator 116 is any computing device, or collection of computing devices, configured to generate the secured payloads 108a,b stored in the payload warehouse 106. For instance, the payload generator 114 may implement an encryption protocol 118 to generate secured payloads 108a,b from the payloads 120a,b received from the payload provider 122. In some embodiments, the payload generator 116 (e.g., using the encryption protocol 118) encrypts a private key 124a,b of a payload 120a,b based on the corresponding public key 110a,b. For instance, an encryption vector for a given private key 124a,b may be determined using the corresponding public key 110a,b. Examples of such embodiments are described in greater detail below with respect to FIGS. 2 and 3A. The payload generator 116 may be implemented using the processor, memory, and interface of the device 500 described with respect to FIG. 5 below.

The payload provider 122 is generally any source of an original payload 120a,b which a user (e.g., an administrator of payload warehouse 106) wishes to provide to devices 102a-g. For instance, the payload provider 122 may be a provider of digital certificates (e.g., a certificate authority) used to implement the two-way authentication and verification associated with demand response operation of HVAC systems, as described above. While various examples and embodiments are typically described in this disclosure with respect to a payload provider 122 that is associated with providing a plurality of payloads 120a,b associated with digital certificates, it should be understood that any appropriate payload provider 122 is contemplated. For instance, the payload provider 122 may be associated with a third party (e.g., a regulatory body, e.g., a vendor of certified digital certificates, or the like). The payload provider 122 may be associated with the same entity administering the payload warehouse 106.

Network 126 facilitates communication between and amongst the various components of the system 100. This disclosure contemplates network 126 being any suitable network operable to facilitate communication between the components of the system 100. Network 126 may include any interconnecting system capable of transmitting audio, video, signals, data, messages, or any combination of the preceding. Network 126 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. As illustrated in FIG. 1, communication between the payload provider 122, payload generator 116, and payload warehouse 106 may not be performed over the same network 126 used for communication between the warehouse 106 and the devices 102a-g. This may further improve security and reduce risk of compromising the payloads 120a,b.

In an example operation of the system 100, an administrator of the payload warehouse 106 requests a set of payloads 120a,b from the payload provider 122. For example, the administrator may acquire a set of digital certificate payloads 120a,b from a certificate authority provider 122. The secured payload generator 116 generally generates a secured payload 108a,b for each of the original payloads 120a,b. For example, as described in greater detail below with respect to FIGS. 2 and 3A, the secured payload generator 116 may determine an encryption vector based at least in part on the public key 110a,b of the original payload 120a,b and encrypt the private key 124a,b using the determined encryption vector to generate the secured payload 108a,b. Each secured payload 108a,b generated in this fashion includes a public key 110a,b, an encrypted private key 112a,b, and metadata 114a,b. The secured payloads 108a,b are stored in the secured payload warehouse 106 until they are needed by devices 102a-g.

Once secured payloads 108a,b are stored in the secured payload warehouse 106, devices 102a-g may request these payloads 108a,b. For example, a device 102a-g may request a secured payload 108a,b from the secured payload warehouse 106. The device 102a-g may receive a requested secured payload 108a,b and use decryption protocol 104 to decrypt the secured payload 108a,b to generate the original payload 120a,b. Further details of this and related example operations of system 100 are described below with respect to FIGS. 2, 3A, and 3B.

In another example operation of the system 100, device 102a-g may request that a payload 108a,b be provisioned from the payload warehouse 106. For example, a user of the device 102a-g may request that a feature requiring information in the payload 108a,b be initiated. The device 102a-g may provide information about the device 102a-g (e.g., a device serial number, a processor identifier, and/or the like) to the payload warehouse 106, and the payload warehouse 106 may use this information to encrypt the requested payload 108a,b. For instance, a requested payload 108a,b may be provided in an encrypted envelope to provide further security. Since the payload 108a,b is encrypted using information specific to the requesting device 102a-g, only the requesting device 102a-g is generally capable of decrypting the payload 108a,b (e.g., of "opening" the encrypted envelope). Once a device 102a-g decrypts a received payload 108a,b, the device 102a-g may check that the payload 108a,b includes expected contents. The payload warehouse 106 may update information associated with the inventory of the warehouse 106 if the device 102a-g reports that the payload 108a,b has been accepted. Further details of this and related example operations of system 100 are described below with respect to FIG. 4.

Payload Encryption and Decryption for Secured Payload Delivery

Figure 2A:
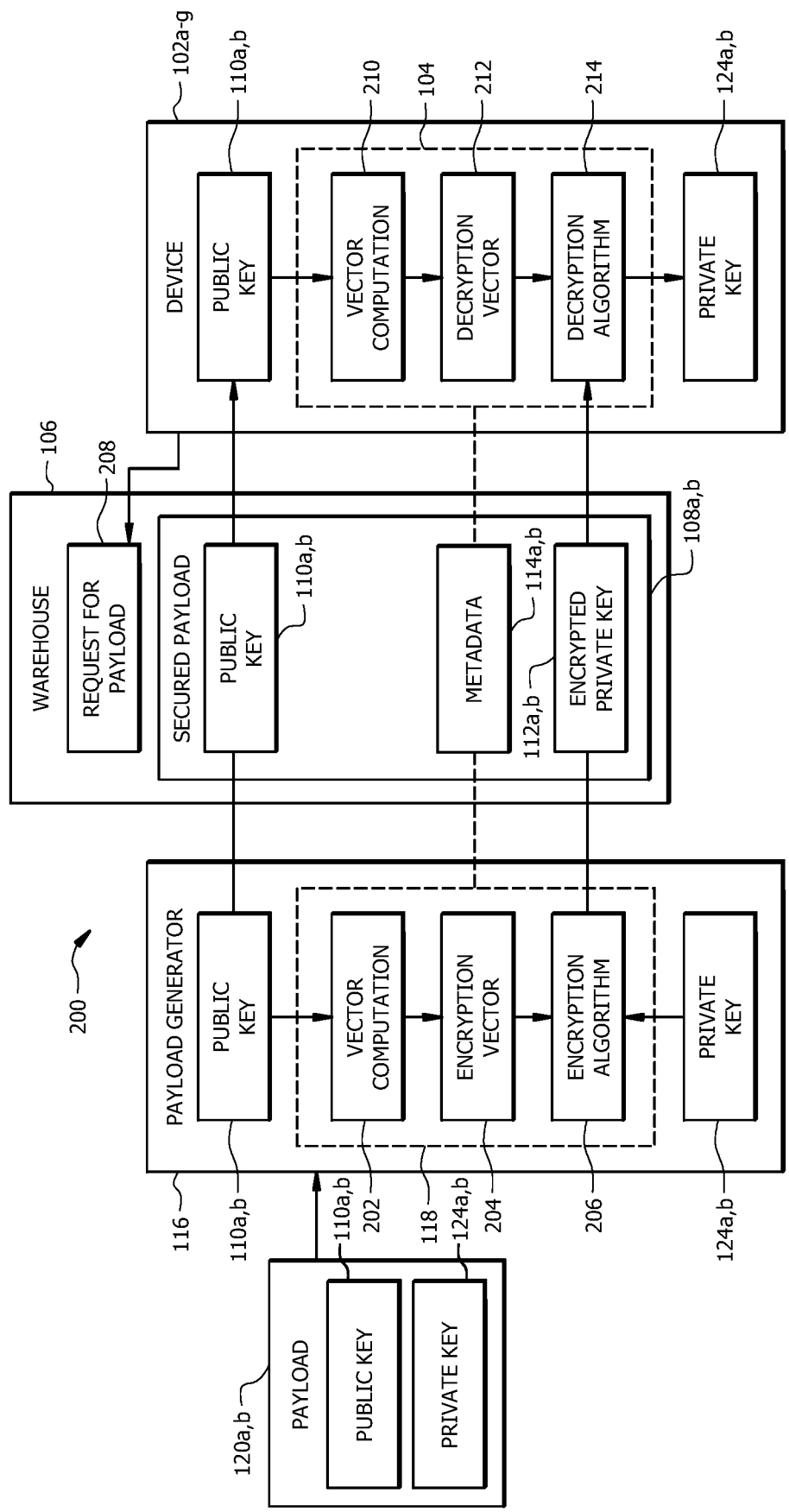
FIG. 2A is a flow diagram illustrating the encryption, storage, delivery, and decryption of a payload using the system illustrated in FIG. 1.

FIG. 2A is a diagram 200 illustrating operation of the payload generator 116, payload warehouse 106, and devices 102a-g, according to an illustrative embodiment of this disclosure. As shown in FIG. 2A, a public key 110a,b and a corresponding private key 124a,b of a payload 120a,b are used by the encryption protocol 118 to generate the unique secured private key 112a,b and metadata 114a,b that are stored in payload warehouse 106. As shown in this example, the encryption protocol 118 may include a computation 202 of an encryption vector 204 using the public key 110a,b. The encryption vector 204 generally includes a string of characters, which is interpretable by an encryption algorithm for appropriately encrypting information (e.g., a file, a portion of a file, or the like). The metadata 114a,b generally includes information associated with how a secured payload 108a,b was generated (e.g., how a private key 124a,b was encrypted by encryption protocol 118), such as properties of the encryption vector 204 (e.g., or an associated decryption vector 212), how private key 124a,b was encrypted using an encryption algorithm 206 (e.g., using one or more hashes), and the like.

Figure 2B:
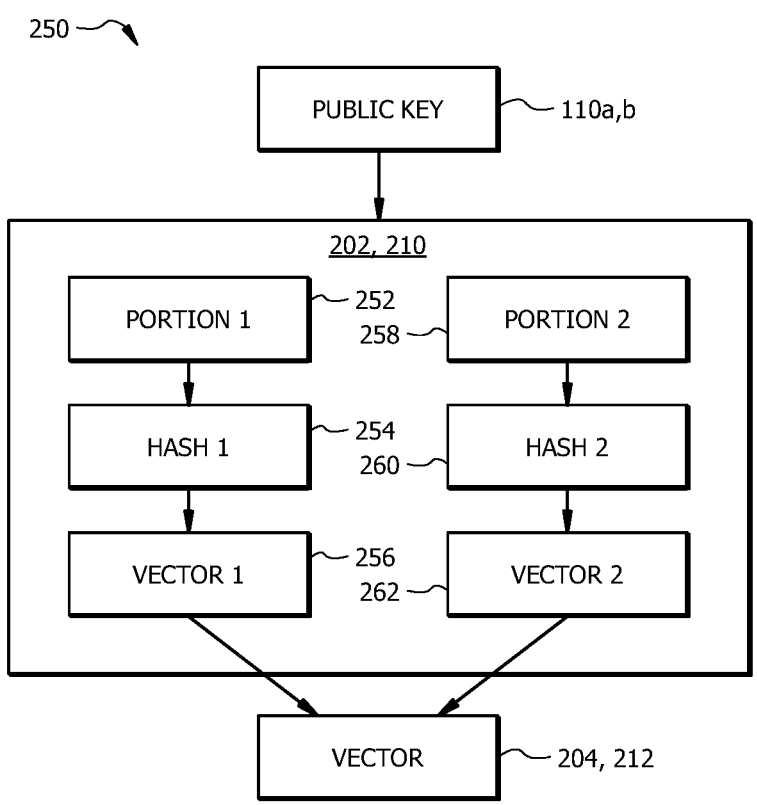
FIG. 2B is a flow diagram illustrating the determination of a vector for encryption and/or decryption based on a public key.

As illustrated in diagram 250 of FIG. 2B, the encryption vector 204 may be determined at vector computation 202 by applying a first hash algorithm 254 (e.g., a SHA-1 algorithm, a SHA-256 algorithm, or the like) to a first portion 252 of the public key 110a,b to generate a first vector portion 256, applying a second hash algorithm 260 (e.g., a SHA-1 algorithm, a SHA-256 algorithm, or the like) to a second portion 258 of the public key 110a,b to generate a second vector portion 260, and combining (e.g., via concatenation) the first vector portion 256 with the second vector portion 262 to generate the encryption vector 204. The first hash algorithm 254 is typically different than the second hash algorithm 260. However, in some embodiments, the first hash algorithm 254 is the same as the second hash algorithm 260. Referring again to FIG. 2A, The encryption vector 204 is provided to an encryption algorithm 206, which is used to encrypt the private key 124a,b to generate the secured private key 112a,b. The encryption algorithm 206 may be any appropriate encryption algorithm.

The payload warehouse 106 may receive a request 208 for a secured payload 108a,b. For instance, a user of the device 102a,b may communicate a request 208 for a payload associated with enabling a certain functionality or feature of the device 102a-g (e.g., a secured payload 108a,b associated with enabling demand response functionality of the device 102a-g). In response to the request 208, the warehouse 106 generally provides the secured payload 108a,b (i.e., the public key 110a,b, the secured private key 112a,b, and the metadata 114a,b) to the device 102a-g.

The device 102a-g generally uses the decryption protocol 104 (illustrated in FIG. 1) to determine the original payload 120a,b (i.e., to determine the original private key 124a,b) from the secured payload 108a,b (i.e., the public key 110a,b, the secured private key 112a,b, and the metadata 114a,b). The decryption protocol 104 includes a determining 210 a decryption vector 212 using the public key 110a,b. The decryption vector 212 is generally any appropriate vector for decrypting the encrypted private key 112a,b. In other words, the decryption vector 212 may act as a decryption key to appropriately decrypt the secured private key 112a,b. In some embodiments, the decryption vector 212 is the same as the encryption vector 204. The decryption vector 212 may be determined using the approach illustrated in FIG. 2B, described above. The decryption vector 212 is then provided to a decryption algorithm 214 to determine the private key 124a,b. Decryption algorithm 214 may be any appropriate decryption algorithm.

In some embodiments, the payload generator 116 is configured to detect anomalous activity by a device 102a-g and update the encryption protocol 118 to ensure continued payload security. Anomalous activity may be any uncommon or suspicious activity observed for a device 102a-g. For instance, anomalous activity may be associated with repeated requests from a device 102a-g for access to inventory of the payload warehouse 106. In response to detecting such anomalous activity, the payload generator 116 may rotate the encryption vectors 204 used in the encryption protocol 118 and/or change one or more of the hash algorithms used for vector computation 202 of the encryption protocol 118. Rotation of the encryption vector 204 may correspond to applying an offset to values, or characters, of the vector 204. For instance, if a vector includes a string "ABCD," this string may be "rotated" by applying an offset to achieve a rotated vector string of "EFGH" (i.e., with the characters in the string increased in alphabetical order by four letters). In some cases, rotation of the encryption vector 204 corresponds to reversing an order of a string of characters, or a portion of a string of characters, in the encryption vector 204. For instance, if a vector includes a string "ABCDE," this string may be "rotated" by reversing an order of all or a portion of the string to achieve a rotated vector string of "CBADE" (i.e., with the first three characters reversed). In some cases, rotation of the encryption vector 204 corresponds to rearranging the order of characters in the encryption vector 204. For instance, if a vector includes a string "ABCDEF," this string may be "rotated" by rearranging characters at certain positions in the string to achieve a rotated vector string of "DBCAEF" (i.e., with the first and fourth characters rearranged). More generally, rotation of the encryption vector 204 may involve one or more of applying an offset to characters in the vector 204, reversing characters in the vector 204, and rearranging characters in the vector 204.

The metadata 114a,b may include information associated with such activity-responsive changes to the encryption protocol 118 (e.g., information identifying an amount that the encryption vector 204 was rotated and/or an amount the corresponding decryption vector 212 should be rotated). For instance, the metadata 114a,b may include information related to an offset to apply to all or a portion of a string of characters in the decryption vector 212, an identification of a portion of a string of characters in the decryption vector 212 to reverse, an identification of character positions in a string of characters in the decryption vector 212 to rearrange, and the like. This metadata 114a,b may be used to appropriately update the decryption protocol 104 by updating a rotation of decryption vector 212 (e.g., which may be rotated the same amount as the encryption vector 204) and/or one or more hash algorithms used to determine the decryption vector 212. In some embodiments, following decryption of the encrypted private key 112a,b, the device 102a-g only stores the private key 124a,b in temporary memory (e.g., RAM) of the device 102a-g, such that the private key 124a,b is not accessible when the device 102a-g is powered off. As used in this disclosure, temporary memory, or volatile memory, refers to the working memory of a computing device that is used to perform computing tasks. Temporary memory generally refers to memory which may be accessed relatively rapidly (e.g., as compared to non-volatile memory, such as read-only memory (ROM)). In some cases, temporary memory may be referred to as a cache or cached memory. For example, temporary memory may be random-access memory (RAM), dynamic random-access memory (DRAM), static random-access memory (SRAM), and the like.

Figure 3A:
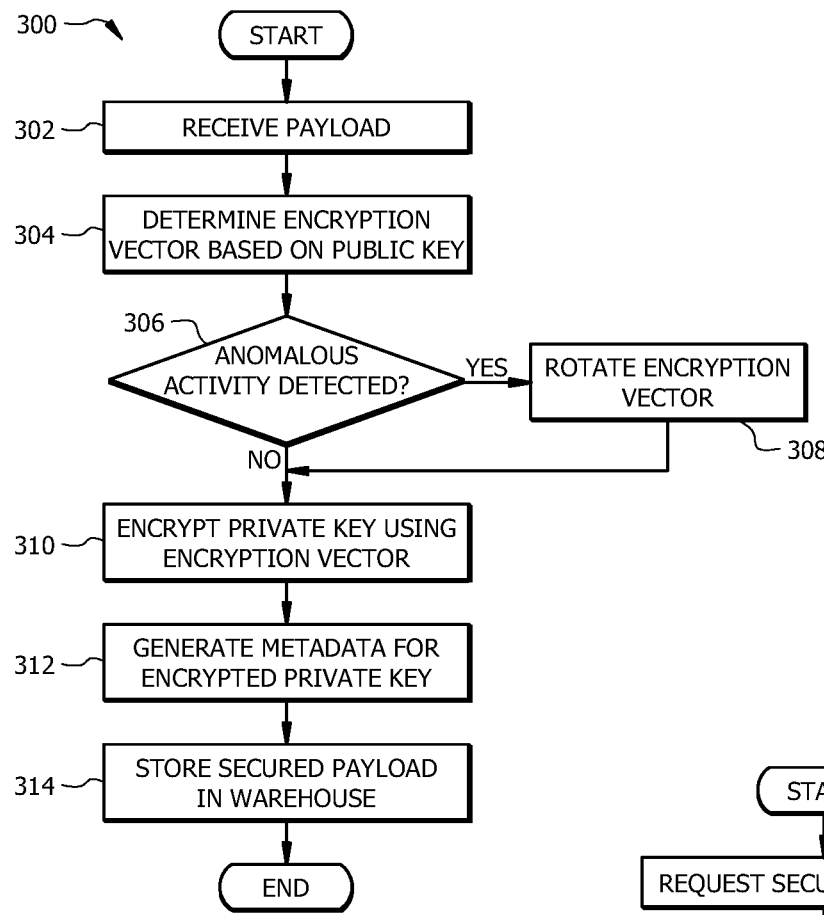
FIG. 3A is an example method of encrypting a payload using the system illustrated in FIG. 1.

FIG. 3A illustrates an example method 300 of encrypting a payload 120a,b by the payload generator 116 of FIGS. 1 and 2. Method 300 facilitates the secure storage of payloads 120a,b as secured payloads 108a,b, such that they may be deployed to appropriate devices 102a-g (e.g., when needed by the device 102a-g). Method 300 provides improved efficiency and security over previous technology by providing more effective encryption of private keys 124a,b than was previously possible and preventing unneeded payloads 120a,b from being loaded to devices 102a-g when they are not needed.

Method 300 may begin at step 302, where one or more payloads 120a,b are received by the payload generator 116. For instance, if the payloads 120a,b are associated with digital certificates (e.g., for implementing demand response functions of a smart thermostat device), a set of hundreds or more of the payloads 120a,b may be received by the secure payload generator 116 for storage in the payload warehouse 106. As an example, the secure payload generator 116 may transmit a request for the one or more payloads 120a,b along with any other appropriate information for identifying the payloads 120a,b requested. Following this request, the secure payload generator 116 may receive the payload(s) 120a,b at step 302.

At step 304, the payload generator 116 determines an encryption vector 204 for the given payload 120a,b, based on the public key 110a,b of the payload 120a,b. For example, the encryption vector 204 may be determined at step 304 by applying a first hash algorithm (e.g., a SHA-1 algorithm, a SHA-256 algorithm, or the like) to a first portion of the public key 110a,b to generate a first vector portion, applying a second hash algorithm (e.g., a SHA-1 algorithm, a SHA-256 algorithm, or the like) to a second portion of the public key 110a,b to generate a second vector portion, and combining (e.g., via concatenation) the first vector portion with the second vector portion to generate the encryption vector 204. An example of determining an encryption vector 204 using such an approach is illustrated in FIG. 2B, which is described in greater detail above.

At step 306, the secure payload generator 116 determines whether any anomalous or suspicious activity has been detected. For instance, anomalous activity may be any uncommon or suspicious activity observed for a device 102a-g. For instance, anomalous activity may be associated with repeated requests from a device 102a-g for access to inventory of the payload warehouse 106. If anomalous activity is detected, the secure payload generator 116 proceeds to step 310 to encrypt the private key 124a,b of the payload 120a,b using the encryption vector 204 calculated at step 304. However, if anomalous activity is detected, the secure payload generator 116 proceeds to step 308 to rotate the encryption vector 204 (e.g., as described above with respect to FIG. 2A). In some cases, the secure payload generator 116 may also or alternatively modify a hash algorithm used to determine the encryption vector at step 308. At step 310, the secure payload generator 116 encrypts the private key 124a,b using the encryption vector 204 (e.g., as described above with respect to FIG. 2A). Any appropriate encryption algorithm 206 may be used to encrypt the private key 120a,b using the encryption vector 204 (whether encrypted at step 308 or not).

At step 312, the secure payload generator 116 generates and/or identifies metadata 114a,b to include in the secured payload 108a,b. As described above, the metadata 114a,b generally includes information associated with how a secured payload 108a,b was generated. For example, the metadata 114a,b may include information associated with one or more hashes to be used for decrypting the secured private key 112a,b (e.g., information associated with hashes used to generate one or both of the encryption vector 204 and the decryption vector 212). The metadata 114a,b may further include information about the amount the encryption vector 204 was rotated at step 308 (e.g., or corresponding information associated with the amount the decryption vector 212 should be rotated to appropriately decrypt the secured private key 112a,b). At step 314, the secured payload 108a,b (i.e., the public key 110a,b, secured private key 112a,b, and the metadata 114a,b) is stored in the payload warehouse 106.

Figure 3B:
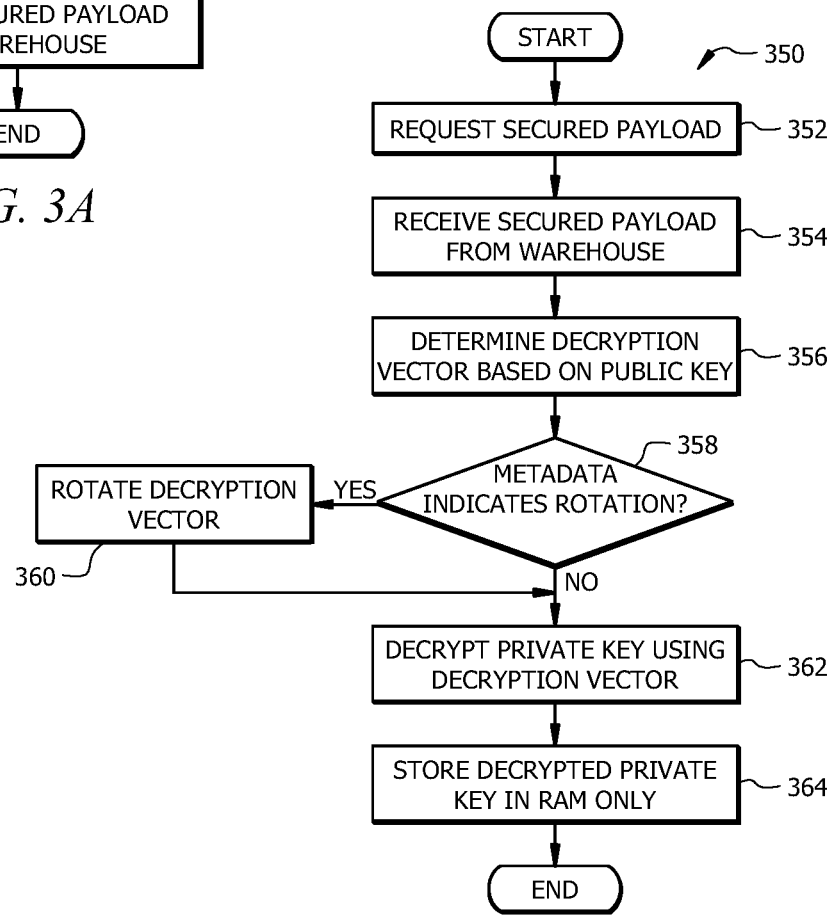
FIG. 3B is an example method of decrypting a payload using the system illustrated in FIG. 1.

FIG. 3B illustrates an example method 350 of decrypting a secured payload 108a,b (e.g., the secured payload 108a,b generated in method 300). Method 350 may begin at step 352 where a device 102a-g requests a secured payload 108a,b from the payload warehouse 106. For example, a user of the device 102a,b may input a request 208 for a payload associated with enabling certain functionality or features of the device 102a-g (e.g., a secured payload 108a,b associated with enabling demand response functionality of the device 102a-g). The request 208 may be transmitted via network 126 to the payload warehouse 106. At step 354, the device 102a-g receives the secured payload 108a,b in response to the request 208 at step 352.

At step 356, the device 102a-g determines a decryption vector 212 for the secured payload 108a,b, based on the public key 110a,b of the secured payload 108a,b. For example, the decryption vector 212 may be determined at step 356 by applying a first hash algorithm (e.g., a SHA-1 algorithm, a SHA-256 algorithm, or the like) to a first portion of the public key 110a,b to generate a first vector portion, applying a second hash algorithm (e.g., a SHA-1 algorithm, a SHA-256 algorithm, or the like) to a second portion of the public key 110a,b to generate a second vector portion, and combining (e.g., via concatenation) the first vector portion with the second vector portion to generate the decryption vector 212. An example of determining a decryption vector 212 using such an approach is illustrated in FIG. 2B, which is described in greater detail above.

At step 358, the device 102a-g determines whether the metadata 114a,b indicates that the decryption vector 212 should be rotated. For instance, the metadata 114a,b may include an entry associated with an offset amount by which to "rotate" a string included in the decryption vector 212, similarly to as described above for rotation of the encryption vector 204 (e.g., as described above with respect to FIG. 2A). If rotation is not indicated by the metadata 114a,b, the device 102a-g proceeds to step 362 to decrypt the secured private key 112a,b. Otherwise, if rotation is indicated by the metadata 114a,b, the device 102a-g proceeds to step 360 to rotate the decryption vector 212. If the metadata 114a,b also or alternatively indicated that one or more hashes used to determine the decryption vector 212 should be changed, the decryption vector 212 may be redetermined using the appropriate hash(es) identified in the metadata 114a,b.

At step 362, the device 102a-g decrypts the secured private key 112a,b using the decryption vector 212 (e.g., as described above with respect to FIG. 2A). For example, any appropriate decryption algorithm 214 may be used to decrypt the secured private key 112a,b using the decryption vector 212 (whether rotated at step 360 or not). At step 364, the decrypted private key 124a,b may be stored in a temporary memory (e.g., RAM) of the device 102a-g. Storing the decrypted private key 124a,b in temporary memory may further prevent compromise of the private key 124a,b, as described above.

Modifications, additions, or omissions may be made to methods 300 and 350 depicted in FIGS. 3A-B. Methods 300 and 350 may include more, fewer, or other steps. For example, steps may be performed in parallel or in any suitable order. While at times discussed as secured payload generator 116, device 102a-g performing steps of methods 300 and 350, respectively, any suitable device or components of the system 100 may perform one or more steps of the methods 300, 350.

Secure Provisioning of a Payload

As described above, in certain embodiments, this disclosure facilitates the more reliable and secure provisioning of digital payloads to devices than was possible with previous technology and can perform this provisioning on an as-needed basis (e.g., when a user of a device requests the payload). As described in greater detail below with respect to FIG. 4, the secured payloads 108a,b may be further encrypted such that only a requesting device 102a-g has the appropriate information for decrypting the secured payloads 108a,b, thereby adding a further layer of security during payload provisioning.

Figure 4:
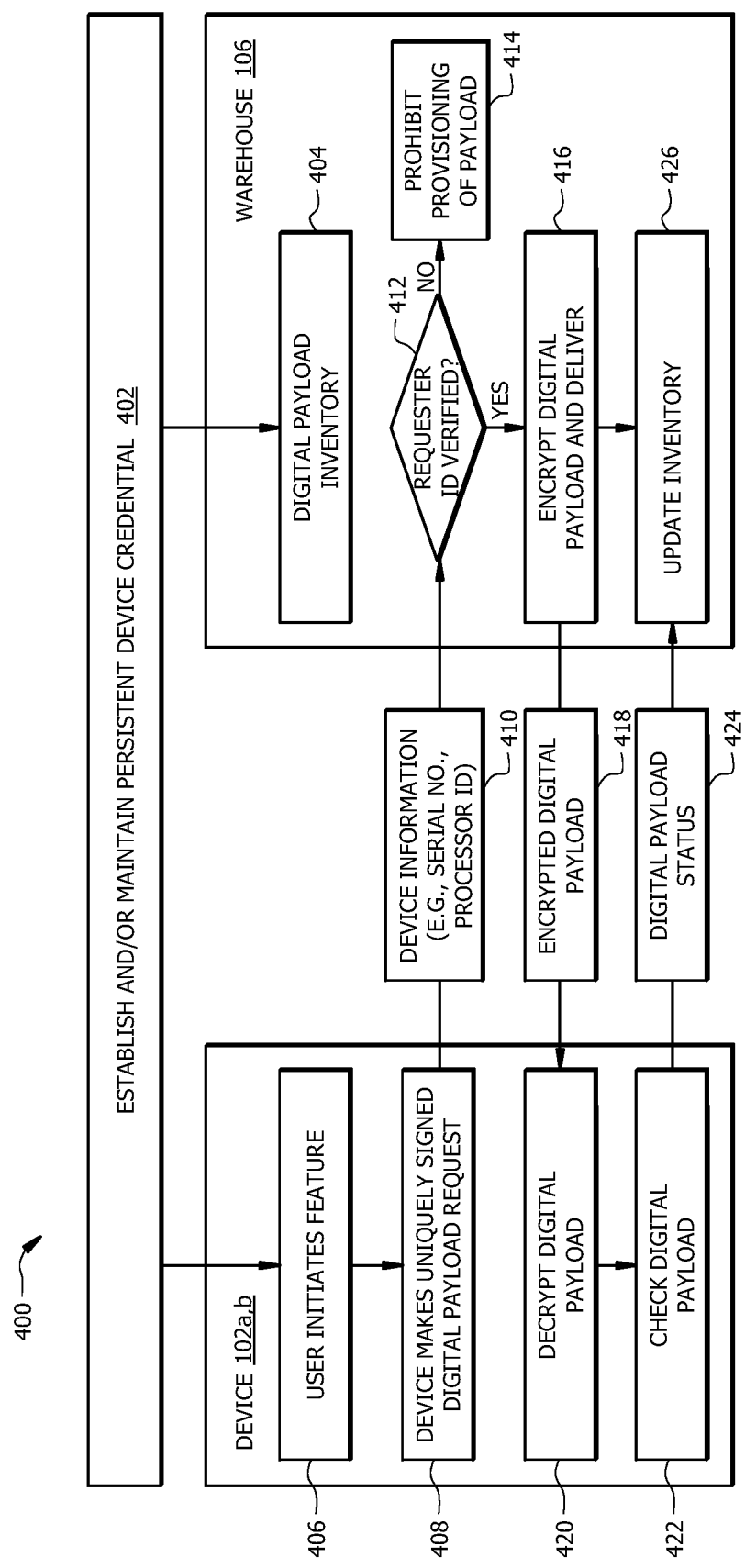
FIG. 4 is a flow diagram illustrating a method of provisioning a payload from a digital warehouse to a device of the system of FIG. 1.

FIG. 4 is a flow diagram illustrating a method 400 of provisioning a payload (e.g., a secured payload 108a,b or any other appropriate digital payload) from the payload warehouse 106 to a device 102a-g. The method 400 may include a step 402 of establishing a and/or maintaining a credential for the device 102a-g. The credential may be any information used to associate the device 102a-g with the warehouse 106. The credential may be used at step 412 to verify that the device 102a-g is approved to receive a payload from the inventory 404 of the payload warehouse 106.

The payload warehouse 106 generally maintains a digital payload inventory 404, which includes a plurality of payloads (e.g., secured payloads 108a,b of FIG. 1). While the payload inventory 404 may include the secured payloads 108a,b described above with respect to FIG. 1, it should be understood that the payload warehouse 106, described with respect to the method 400 of FIG. 4, may generally include any payload type (e.g., payloads which may or may not have been secured using the approaches described above with respect to FIGS. 2-3). As such the payload inventor 404 may include unsecured payloads 120a,b or other any other information or file(s) to be transmitted between entities and/or devices.

At step 406, a user requests to initiate a feature of the device 102a-g. For example, a user may access a user interface associated with the device 102a-g and request to initiate the feature of the device 102a-g. For instance, in the example case where the device 102a-g is smart thermostat device, the user may request to initiate a demand response feature of the device 102a-g. Following the user's initiation of the feature at step 406, the device 102a-g generates a uniquely signed digital payload request at step 408. This request (e.g., which may the same as or similar to request 208 of FIG. 2A) at least includes device information 410 which is provided to the payload warehouse 106. The device information 410 may include, for instance, a serial number of the device 102a-g and a processor identifier of the device 102a-g.

At step 412, the payload warehouse 106 determines whether requesting device 102a-g is verified for receiving a payload (e.g., a secured payload 108a,b) from the payload warehouse 106. The payload warehouse 106 may determine whether the device 102a-g is verified, for example, by comparing the device information 410 received from the device 102a-g to the device credentials established and/or maintained at step 402. For instance, if an established device credential corresponds the same device information 410 received from the device 102a-g, the requester identification will be verified at step 412 (and the method 400 follows the "yes" path from step 412). Otherwise, if there is no established device credential associated with the device information 410, then the requester identification 412 is not verified at step 412, and the payload warehouse 106 prohibits provisioning of the payload (e.g., a secured payload 108a,b) (and the method 400 follows the "no" path from step 412).

At step 416, the payload warehouse 106 encrypts the digital payload (e.g., the secured payload 108a,b) and delivers the encrypted digital payload 418. So that only the requesting device 102a-g can decrypt the encrypted digital payload 418, the payload warehouse 106 encrypts the payload (e.g., the secured payload 108a,b) using at least a portion of the device information 410 received from the device 102a-g. For example, the payload warehouse 106 may apply a first hash algorithm (e.g., a SHA-1 algorithm, a SHA-256 algorithm, or the like) to at least a portion of the device serial number of device information 410 to generate a first encryption vector portion, apply a second hash algorithm (e.g., a SHA-1 algorithm, a SHA-256 algorithm, or the like) to at least a portion of the processor identifier of the device information 410 to generate a second encryption vector portion, and combine (e.g., via concatenation) the first encryption vector portion with the second encryption vector portion to generate the encryption vector used for payload encryption at step 416. For instance, the encryption vector may be generated using a flow the same as or similar to that illustrated in FIG. 2B, where the public key 110a,b of FIG. 2B is replaced with the device information 410 of FIG. 4. Using both a serial number and a processor identifier of the requesting device 102a-g has been found to unexpectedly improve the reliability and security of the encryption provided by the payload warehouse 106 (i.e., to improve the security of the encrypted digital payload 418).

At step 420, the device 102a-g receives and decrypts the encrypted digital payload 418. For example, the device 102a-g may determine a decryption vector, based at least in part on the device information 410 provided to the payload warehouse 106 and decrypt the encrypted digital payload 418 using this decryption vector. Such a decryption vector may be determined, for example, by applying a first hash algorithm (e.g., a SHA-1 algorithm, a SHA-256 algorithm, or the like) to at least a portion of the device serial number of the device information 410 to generate a first decryption vector portion, applying a second hash algorithm (e.g., a SHA-1 algorithm, a SHA-256 algorithm, or the like) to at least a portion of the processor identifier of the device information 410 to generate a second decryption vector portion, and combining (e.g., via concatenation) the first decryption vector portion with the second decryption vector portion to generate the decryption vector used for payload decryption at step 420. Step 420 at least includes decrypting the encrypted digital payload 418 to determine the payload (e.g., a payload 108a,b) stored in the payload warehouse 106. Since, as described above, the inventory 404 of the payload warehouse 106 may only include secured payloads 108a,b, further decryption may be performed (e.g., as described above with respect to step 362 of FIG. 3B) to determine a fully decrypted payload 120a,b, which is appropriate for use by the device 102a-b to implement the feature(s) requested at step 406. In some cases, if a sufficiently long period of time (i.e., greater than a threshold time) passes between when device information 410 is provided to the payload warehouse 106 and when the encrypted digital payload 418 is received, the device 102a-g may reject the payload 418 and not proceed with decrypting the payload at step 420.

At step 422, the device 102a-g inspects the decrypted payload (e.g., the secured payload 108a,b or the fully decrypted payload 120a,b). For example, the device 102a-g may scan the decrypted payload to verify that the payload includes expected contents (e.g., expected contents such as a public key 110a,b and private key 124a,b). If the original payload (e.g., a payload 108a,b or 120a,b) includes a digital certificate, the device 102a-g may further scan the decrypted payload to verify that one or more certificate chains are complete for the digital certificate. For instance, the device 102a-g may verify that a certificate authority chain links the certificate to the appropriate certificate authority (e.g., to a known payload provider 122). In some embodiments, the device 102*a-g* scans the decrypted payload (e.g., a payload 108*a,b* or 120*a,b*) to verify that the payload is still active (e.g., based on an expiration date included in the payload). In some cases, a digital payload status 424 associated with whether the device 102*a-g* passes these payload checks of step 422 and/or whether the device 102*a-g* accepts the encrypted payload 418 for use, is provided to the payload warehouse 106. If the checks fail at step 422, the status 424 may not be sent or they status may indicate that the encrypted digital payload 418 is accepted by the device 102*a-g*.

The digital warehouse 106 may use the digital status 424 to appropriately update information associated with the payload inventory 404. For example, the inventor 404 may be updated to reflect that the payload requested by the device 102*a-g* has been consumed. For example, a count of the digital payload inventory 404 may by changed at step 426 to reflect the consumed payload. For example, the payload warehouse 106 may decrease the inventory count by one (i.e., for the encrypted digital payload 418 provided to and accepted by the device 102*a-g*. The update at step 426 may include updating a record of which devices 102*a-g* have been provided encrypted digital payloads 418. This information may be used by the payload warehouse 106 (and/or the connected payload generator 116 of FIGS. 1 and 2) to identify anomalous activities associated with a given device 102*a-g* making multiple requests for a digital payload when the device is shown to already have a payload according to inventory 404.

Example Devices

Figure 5:
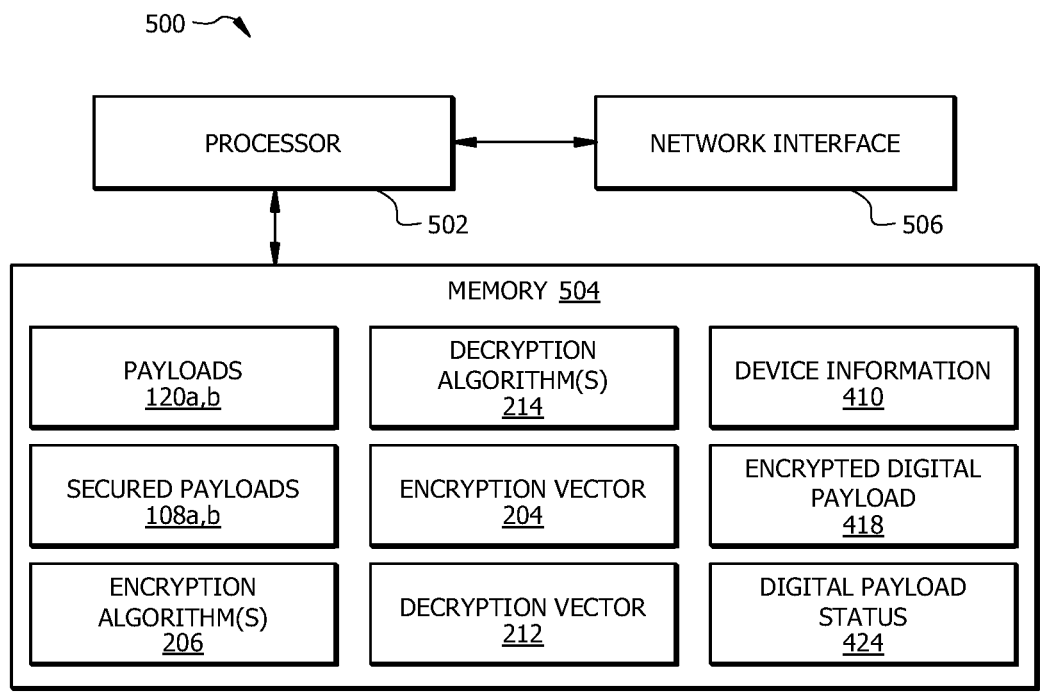
FIG. 5 is a diagram of an example device for implementing various components of the system illustrated in FIG. 1.

FIG. 5 is a schematic diagram of an embodiment of a device 500. The controller 500 may be used to implement any of the devices 102*a-g*, the payload warehouse 106, the secured payload generator 116, and the payload provider 122 of FIG. 1. The device 500 includes a processor 502, a memory 504, and a network interface 506.

The processor 502 includes one or more processors operably coupled to the memory 504. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs) that communicatively couples to memory 504 and controls the operation of the device 500. The processor 502 may be a programmable logic device, a microcontroller, a microprocessor, or any suitable combination of the preceding. The processor 502 is communicatively coupled to and in signal communication with the memory 504. The one or more processors are configured to process data and may be implemented in hardware or software. For example, the processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory 504 and executes them by directing the coordinated operations of the ALU, registers, and other components. The processor 502 may include other hardware and software that operates to process information and perform any of the functions described herein (e.g., with respect to FIGS. 2-4). The processor 502 is not limited to a single processing device and may encompass multiple processing devices.

The memory 504 includes one or more disks, tape drives, or solid-state drives, and may be used as an over-flow data storage device, to store programs when such programs are selected for execution, and to store instructions and data that are read during program execution. The memory 504 may be volatile or non-volatile and may include ROM, RAM, ternary content-addressable memory (TCAM), dynamic random-access memory (DRAM), and static random-access memory (SRAM). The memory 504 is operable to store payloads 120*a,b*, secured payloads 108*a,b*, encryption algorithm(s) 206, decryption algorithm(s) 214, encryption vector 204, decryption vector 212, device information 410, encrypted digital payload(s) 418, digital payload status(es) 242, and/or any other logic and/or instructions for performing the function described in this disclosure.

The network interface 506 is configured to enable wired and/or wireless communications (e.g., via network 126). The network interface 506 is configured to communicate data between the device 500 and other network devices, systems, or domain(s). For example, the network interface 506 may comprise a WIFI interface, a local area network (LAN) interface, a wide area network (WAN) interface, a modem, a switch, or a router. The processor 502 is configured to send and receive data using the network interface 506. The network interface 506 may be configured to use any suitable type of communication protocol.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system, comprising:
   a network-connected device configured to:
      receive a user request to initiate a feature of the device;
      in response to receiving the request, provide device information to a payload warehouse; and
   the payload warehouse configured to:
      store a payload inventory comprising a digital payload, wherein the digital payload comprises data which may be used by the network-connected device to implement the user-requested feature;
      encrypt, using an encryption vector based on the device information, the digital payload; and
      provide the encrypted digital payload to the network-connected device;

wherein the network-connected device is further configured to:
  decrypt the encrypted digital payload, thereby determining a decrypted digital payload; and
  in response to determining that the decrypted digital payload includes expected contents, provide a payload status to the payload warehouse, the payload status indicating that the decrypted digital payload is accepted by the network-connected device; and
the payload warehouse is further configured to update the payload inventory, based on the payload status, to reflect that the digital payload has been consumed.

2. The system of claim 1, the network-connected device further configured to:
  receive the encrypted digital payload;
  determine a decryption vector, based at least in part on the device information provided to the payload warehouse; and
  decrypt the encrypted digital payload using the decryption vector, thereby determining the decrypted digital payload.

3. The system of claim 1, wherein:
  the decrypted digital payload includes a digital certificate; and
  the network-connected device is further configured to:
    prior to determining that the decrypted digital payload satisfies check criteria, determine whether a certificate authority chain of the digital certificate is complete;
    in response to determining the certificate authority chain of the digital certificate is complete, provide the payload status to the payload warehouse; and
    in response to determining the certificate authority chain of the digital certificate is not complete, prevent provision of the payload status to the payload warehouse.

4. The system of claim 1, the payload warehouse further configured to:
  prior to encrypting the digital payload, verify whether the network-connected device is verified to receive the digital payload, based at least in part on the device information;
  in response to determining the network-connected device is verified to receive the digital payload, proceed with encrypting the digital payload; and
  in response to determining the network-connected device is not verified to receive the digital payload, prevent provisioning of the digital payload.

5. The system of claim 1, wherein:
  the device information comprises a device serial number and a processor identifier; and
  the payload warehouse is further configured to determine the encryption vector by:
    applying a first hash algorithm to at least a portion of the device serial number to generate a first encryption vector portion;
    applying a second hash algorithm to at least a portion of the processor identifier to generate a second encryption vector portion; and
    combining the first encryption vector portion with the second encryption vector portion to generate the encryption vector.

6. The system of claim 2, wherein:
  the device information comprises a device serial number and a processor identifier; and
  the network-connected device is further configured to determine the decryption vector by:
    applying a first hash algorithm to at least a portion of the device serial number to generate a first decryption vector portion;
    applying a second hash algorithm to at least a portion of the processor identifier to generate a second decryption vector portion; and
    combining the first decryption vector portion with the second decryption vector portion to generate the decryption vector.

7. The system of claim 1, the network-connected device further configured to:
  receive the encrypted digital payload;
  following receiving the encrypted digital payload, determine that greater than a threshold time has expired between providing the device information to the payload warehouse and receiving the encrypted digital payload; and
  in response to determining that greater than the threshold time has expired between providing the device information to the payload warehouse and receiving the encrypted digital payload, prevent decryption of the encrypted digital payload.

8. A method comprising:
  receiving a user request to initiate a feature of a network-connected device;
  in response to receiving the request, providing device information to a payload warehouse;
  storing a payload inventory comprising a digital payload, wherein the digital payload comprises data which may be used by the network-connected device to implement the user-requested feature;
  encrypting, using an encryption vector based on the device information, the digital payload;
  providing the encrypted digital payload to the network-connected device;
  decrypting the encrypted digital payload, thereby determining a decrypted digital payload;
  in response to determining that the decrypted digital payload includes expected contents, providing a payload status to the payload warehouse, the payload status indicating that the decrypted digital payload is accepted by the network-connected device; and
  updating the payload inventory, based on the payload status, to reflect that the digital payload has been consumed.

9. The method of claim 8, further comprising:
  receiving the encrypted digital payload;
  determining a decryption vector, based at least in part on the device information provided to the payload warehouse; and
  decrypting the encrypted digital payload using the decryption vector, thereby determining the decrypted digital payload.

10. The method of claim 8, wherein:
  the decrypted digital payload includes a digital certificate; and
  the method further comprises:
    prior to determining that the decrypted digital payload satisfies check criteria, determining whether a certificate authority chain of the digital certificate is complete;
    in response to determining the certificate authority chain of the digital certificate is complete, providing the payload status to the payload warehouse; and in response to determining the certificate authority chain of the digital certificate is not complete, preventing provision of the payload status to the payload warehouse.

11. The method of claim 8, further comprising:

prior to encrypting the digital payload, verifying whether the network-connected device is verified to receive the digital payload, based at least in part on the device information;

in response to determining the network-connected device is verified to receive the digital payload, proceeding with encrypting the digital payload; and in response to determining the network-connected device is not verified to receive the digital payload, preventing provisioning of the digital payload.

12. The method of claim 8, wherein:

the device information comprises a device serial number and a processor identifier; and the method further comprising determining the encryption vector by:

applying a first hash algorithm to at least a portion of the device serial number to generate a first encryption vector portion;

applying a second hash algorithm to at least a portion of the processor identifier to generate a second encryption vector portion; and combining the first encryption vector portion with the second encryption vector portion to generate the encryption vector.

13. The method of claim 9, wherein:

the device information comprises a device serial number and a processor identifier; and the method further comprising determining the decryption vector by:

applying a first hash algorithm to at least a portion of the device serial number to generate a first decryption vector portion;

applying a second hash algorithm to at least a portion of the processor identifier to generate a second decryption vector portion; and combining the first decryption vector portion with the second decryption vector portion to generate the decryption vector.

14. The method of claim 8, further comprising:

receiving the encrypted digital payload;

following receiving the encrypted digital payload, determining that greater than a threshold time has expired between providing the device information to the payload warehouse and receiving the encrypted digital payload; and in response to determining that greater than the threshold time has expired between providing the device information to the payload warehouse and receiving the encrypted digital payload, preventing decryption of the encrypted digital payload.

15. A device communicatively coupled to a network, the device comprising a processor configured to:

receive a user request to initiate a feature of the device;

in response to receiving the request, provide device information to a payload warehouse;

following providing the device information to the payload warehouse, receive an encrypted digital payload from the payload warehouse, wherein the encrypted digital payload is encrypted at least in part based on the provided device information;

determine a decryption vector, based at least in part on the device information provided to the payload warehouse;

decrypt the encrypted digital payload using the decryption vector, thereby determining a decrypted digital payload, wherein the decrypted digital payload comprises data which may be used by the processor to implement the user-requested feature; and in response to determining that the decrypted digital payload includes expected contents, provide a payload status to the payload warehouse, the payload status indicating that the decrypted digital payload is accepted by the device, wherein the payload warehouse uses the payload status to update a payload inventory to reflect that the digital payload has been consumed.

16. The device of claim 15, wherein:

the decrypted digital payload includes a digital certificate; and the processor is further configured to:

prior to determining that the decrypted digital payload satisfies check criteria, determine whether a certificate authority chain of the digital certificate is complete;

in response to determining the certificate authority chain of the digital certificate is complete, provide the payload status to the payload warehouse; and in response to determining the certificate authority chain of the digital certificate is not complete, prevent provision of the payload status to the payload warehouse.

17. The device of claim 15, the processor further configured to:

receive the encrypted digital payload;

following receiving the encrypted digital payload, determine that greater than a threshold time has expired between providing the device information to the payload warehouse and receiving the encrypted digital payload; and in response to determining that greater than the threshold time has expired between providing the device information to the payload warehouse and receiving the encrypted digital payload, prevent decryption of the encrypted digital payload.

18. The system of claim 1, wherein the payload warehouse is further configured to:

receive the device information provided by the network-connected device; and determine the encryption vector based at least in part on the received device information.

19. The method of claim 8, further comprising:

receiving the device information provided by the network-connected device; and determining the encryption vector based at least in part on the received device information.

* * * * *